United States Patent [19]

Nishida et al.

[11] Patent Number: 5,164,445
[45] Date of Patent: Nov. 17, 1992

[54] POLYAMIDE RESIN COMPOSITION

[75] Inventors: Takashi Nishida; Shigeo Kobayashi, both of Ohtsu, Japan

[73] Assignee: Toyo Boseki Kabushiki Kaisha, Osaka, Japan

[21] Appl. No.: 582,843

[22] PCT Filed: Feb. 7, 1990

[86] PCT No.: PCT/JP90/00153
§ 371 Date: Nov. 23, 1990
§ 102(e) Date: Nov. 23, 1990

[87] PCT Pub. No.: WO90/09409
PCT Pub. Date: Aug. 23, 1990

[30] Foreign Application Priority Data

Feb. 8, 1989 [JP] Japan .................... 1-29496

[51] Int. Cl.⁵ .................. C08L 67/02; C08L 77/00; C08L 77/06
[52] U.S. Cl. .................. 525/41; 525/10; 525/42; 525/425
[58] Field of Search .................. 525/10, 41, 42, 425

[56] References Cited

FOREIGN PATENT DOCUMENTS 53-140350 12/1978 Japan .
55-038978 3/1980 Japan .
59-168059 9/1984 Japan .

*Primary Examiner*—Patricia A. Short
*Attorney, Agent, or Firm*—Leydig, Voit & Mayer

[57] ABSTRACT

The present invention relates to a polyamide resin composition comprising a polyamide resin (A) and a modified polyester elastomer (b) prepared by the reaction of a polyester elastomer with a monomer selected from among unsaturated carboxylic acids and derivatives thereof, which have excellent characteristics in elasticity, chemical, oil, impact resistance and moldability. The resin compositons can be widely used for automobile parts and various kinds of machine parts etc.

5 Claims, No Drawings

POLYAMIDE RESIN COMPOSITION

DETAILED DESCRIPTION OF THE INVENTION

1. Application Fields in Industries

The present invention relates to a polyamide resin composition having excellent characteristics in flexibility, chemical resistance, oil resistance, impact resistance and moldability, providing wide applications of the resin in making automobile parts and machine parts etc.

2. Background of the Art

Polyamide resins formerly aroused large demands because the resins had excellent characteristics in moldability, oil resistance, chemical resistance and heat resistance. Their uses are, however, currently restricted since the resins are still poor in impact resistance and flexibility characteristics.

Many attempts have been proposed to improve impact resistance and flexibility characteristics of the resin, including, for example, well known polyamide resin compositions in which large amounts of plasticizer is mixed in order to provide flexibility. Special polyamide resins including nylon 12, copolymers of various kinds of nylons and polyamide elastomers are known to be improved in impact resistance and flexibility characteristics, as well as compound materials in which polyamide resins are blended with polyolefins or styrene/olefin copolymers modified by unsaturated carboxylic acids.

However, these compound materials involve many problems. In the above-described compound polyamide resins containing large amounts of plasticizer, they involve the deficiency that the agents flow out during long period of use or usage at high temperature, whereby plasticity and softness of the compound resins are lost. Nylon 12, copolymers of various kinds of nylons and polyamide elastomers are more expensive than other kinds of engineering plastics and hence their applications are restricted. In a series of polyamide resins with which modified polyolefins or modified styrene/olefin copolymers are blended, as the amount of blending increases excellent inherent characteristics of the polyamide resins are lost, entailing poor moldability and degradation in oil, chemical and heat resistances.

The present invention was carried out to solve the aforementioned problems and aims to provide a polyamide resin composition having excellent impact resistance and flexibility while maintaining the inherent excellent characteristics of oil, chemical and heat resistance. Among the polyamide resins, polyamides containing xylilene groups represented by polyxylilene adipamide possess gas-barrier characteristic, especially against chloro fluoro carbon gas thereinafter referred to as CFC gas. Since this characteristic is also maintained in the polyamide resins of the present invention, they are best suited for use as hoses for refrigerant.

DISCLOSURE OF THE INVENTION

The polyamide resin composition of the present invention comprises a polyamide resin (A) and a modified polyester elastomer (B) prepared by the reaction of a polyester elastomer with a monomer selected from among unsaturated carboxylic acids and derivatives thereof, thereby achieving the afore-described objective.

The polyamide resin compositions of the present invention are manufactured by mixing (A) polyamide resins and (B) modified polyester elastomer in the weight ratio of (A)/(B) in the range of 95/5 to 5/95 while heating.

The composition of the present invention comprises polyamide resins (A) including for instance nylon 6, nylon 6,6, nylon 6,9, nylon 6,10, nylon 6,12, nylon 6/6,6, nylon 4,6, polyxylilene adipamide, polyhexamethylene terephthalamide, polyphenylene phthalamide, polyxylene adipamide/hexamethylene adipamide, polyesteramide elastomer, polyetheramide elastomer and polyamide-dimeric acid copolymers. These materials can be used separately or in the form of their mixtures, or alternatively, copolymers manufactured from the monomers which are the constituents of above-described resins are also used. The melting point of the polyamide resins should preferably be 170° C. or more in order to make the materials heat resistant. Usually, the relative viscosity of the polyamide resins should preferably be 1.8 or more (as measured in 98% sulfuric acid according to the method described in JIS K6810-1970) and more preferably be 2.0 or more. Polyester elastomers used in the preparations of modified polyester elastomers (B) involved in the composition of the present invention comprise polyester-polyether block copolymers and polyester type block copolymers.

The above-mentioned polyester-polyether block copolymers are block copolymers with the property of elasticity such as that of ribber, impatted by arranging a polyester unit as a hard segment and a polyether unit as a soft segment alternatively and repeatedly.

Acids and alcohols composing the afore-described polyester units mainly comprise aromatic dicarboxylic acids and alkylene glycols with carbon numbers of 2 to 15, respectively. Examples of the dicarboxylic acids comprise terephthalic acid, isophthalic acid, ethylene bis(p-oxybenzoic acid), naphthalene dicarboxylic acid, adipic acid, sebacic acid, 1,4-cyclohexane dicarboxylic acid and p-(β-hydroxyethoxy) benzoic acid etc. The alcohols include ethylene glycol, propylene glycol, tetramethylene glycol, pentamethylene glycol, 2,2-dimetyltrimethylene glycol, hexamethylene glycol, decamethylene glycol, cyclohexane dimethanol, cyclohexanediethanol, benzene dimethanol and benzene diethanol. When polyesters whose molecular weight are high enough to form fibers are synthesized, the combinations of afore-described acids and alcohols are selected so that the melting points of the polyesters obtained should preferably be 200° C. or more.

Polyether units incorporated in the afore-described block copolymers as a soft segment are composed of polyoxyalkylene glycol having a mean molecular weight of approximately 500 to 5000. The polyoxyalkylene glycol unit is composed of the monomer unit whose alkylene group comprises an oxyalkylene group containing 2 to 9 carbon atoms. The preferred examples of the unit include poly(oxyethylene) glycol, poly(oxypropylene) glycol and poly(oxytetramethylene) glycol. Polyethers may be used separately, or in the form of random copolymers or block copolymers or, alternatively they are used in a mixed form of two or more kinds of polyethers. Aliphatic or aromatic groups can also be incorporated in the molecular chains of the polyethers. Sometimes the elements such as sulfur, nitrogen, and phosphorus etc. can be incorporated in the modified polyethers.

Polyester-polyether block copolymers are composed of 1 to 85 wt %, preferably 5 to 80 wt %, of polyether unit and 15 to 99 wt %, preferably 20 to 95 wt %, of polyester unit.

An example of the polyester type block copolymer is manufactured by the reaction between a crystallizable aromatic polyester and a lactone group compound. The crystallizable aromatic polyesters comprise the polymers mainly composed of ester bonds or ester and ether bonds, wherein at least one kind of aromatic group is incorporated in the polymer as a repeating unit, and a hydroxyl group is attached to the Molecule's end. The melting point of the crystallizable aromatic polyesters are, when they are polymerized in high molecular weight resins, preferably 150° C. or more. A molecular weight of 5000 or more is preferably when the polyamide resin compositions of the present invention are used for the forming materials while the resins with a molecular weight of 5000 or less can be successfully used for adhesive and coating materials. Preferred embodiments of the crystallizable aromatic polyesters comprise homo-polyesters, polyester-ether, polyester copolymers and polyester-ether copolymers. Examples of the homo-polyesters include polyethylene terephthalate, polytetramethylene terephthalate, poly-1,4-cyclohexylene-dimethylene terephthalate and polyethylene-2,6-naphthalate. Examples of polyester-ether include polyethylene oxybenzoate and poly-p-phenylenebisoxyethoxyterephthalate. Examples of polyester copolymers or polyester-ether copolymers include the polymers mainly composed of tetramethylene terephthalate units or ethylene terephthalate units, wherein other copolymer components are also incorporated. The copolymer components comprise a tetramethylene terephthalate unit, an ethylene isophthalate unit, a tetramethylene adipate unit, an ethylene adipate unit, a tetramethylene sebacate unit, an ethylene sebacate unit, a 1,4-cyclohexylenedimethylene terephthalate unit, a tetramethylene-p-oxybenzoate unit and an ethylene-p-oxybenzoate unit. The relative molar contents of the tetramethylene terephthalate unit or ethylene terephthalate unit in the polyester copolymers and polyester-ether copolymers are preferably 60% or more.

Although ε-caprolactam is most preferably selected from lactones as the other component constituting the polyester type block copolymers, other lactones such as enantholactone and caprylolactone can also be used for the same purpose. Two or more kinds of the aforementioned lactones can also be used simultaneously.

Polyester type block copolymers can be manufactured by copolymerizing the afore-described crystallizable aromatic polyesters with lactones in the weight ratio of the former to the latter in the range of 97/3 to 5/95. The ratio should preferably be in the range of 95/5 to 30/70. The above-described copolymerization reactions are allowed to proceed by heating and mixing, an appropriate amount of catalyses being added to the reaction mixture, if necessary. The polyester elastomers (polyester-polyether block copolymer and/or polyester type block copolymer) thus obtained can be used separately or by mixing two or more kinds of polymers.

In the present invention, the modifying agents with which the afore-described polyester elastomers are allowed to react to manufacture the modified polyester elastomers are selected from unsaturated carboxylic acids and derivatives thereof. Examples of the unsaturated carboxylic acids comprise acrylic acid, methacrylic acid, α-ethyl acrylic acid, maleic acid, fumaric acid, itaconic acid, citraconic acid, tetrahydrophthalic acid, methyl tetrahydrophthalic acid, endo-bicyclo(2,2,1)hepto-5-ene-2,3-dicarboxylic acid (nadic acid) and methyl-endosis-bicyclo(2,2,1)hepto-5-ene-2,3-dicarboxylic acid (methyl nadic acid) etc. Derivatives of unsaturated carboxylic acids include halides, amides, imides, acid anhydrides and ester derivatives of the afore-described acids. Examples of them comprise malenyl chloride, maleimide, maleic anhydride, citraconic anhydride, monomethyl maleate, dimethyl maleate and glycidyl maleate etc. Of these compounds, unsaturated dicarboxylic acids or anhydrides of unsaturated dicarboxylic acids are preferably used. Especially, maleic acids and nadic acids or acid anhydrides thereof are preferable for the purposes of the present invention.

The above-described modifying agents are used in a relative weight ratio to the polyester elastomers in the range of approximately 0.01 to 20 wt %, preferably in the range of approximately 0.02 to 20 wt %. When the amount is less than 0.01 wt %, the agent has little effect on the improvement of the characteristics of the polyamide resin compositions. Addition of the agent in the amount of more than 20 wt % tends to result in gel formation during the graft reactions.

Although the methods for allowing the polyester elastomers to react with the modifying agents (graft copolymerization reactions) are not restricted, preferable reaction conditions are determined so that undesirable components such as gels are not contained in the modified polyester elastomers manufactured. Also, a decrease in fluidity of the elastomers which entails poor moldability of the material is not desirable. The modified polyester elastomers are actually manufactured by mixing the above-described polyester elastomers with the modifying agents and radical generating agents, followed by melting and blending to allow the graft reaction to proceed. Conventional organic peroxides or diazo compounds can be used as radical generating reagents. Examples of the radical generating agents include benzoyl peroxide, dicumyl peroxides, di-t-butyl peroxide, t-butyl cumyl peroxide, cumene hydroperoxide and azobis-isobutylonitrile etc. The amount of the radical generating agents to be used is 0.05 wt % or more, preferably in the range of 0.1 to 1.5 wt %, of the amount of the polyester elastomers.

In the polyamide resin compositions of the present invention, the preferably weight ratio (A)/(B) of the polyamide resin (A) to the modified polyester elastomers (B) should be in the range of 95/5 to 5/95, more preferably the (A)/(B) ratio being in the range of 90/10 to 10/90. When the weight ratio of the modified polyester elastomers is less than 95/5, no improvements in impact resistance and flexibility of the materials are observed. When the weight ratio of the modified polyester elastomers is more than 5/95, degradations in the characteristics such as the hydrolysis resistant property of the material will occur.

Other additives can be added to the composition of the present invention. These additives include colorants, stabilizers, inorganic fillers, organic fillers, fibrous reinforcement and various kinds of the other assistants. Ordinarily, polyamide resins (A) and modified polyester elastomers (B) are blended while heating, and the above-described additives can be added at anytime during the first, middle or final stage of the blending processes. Conventional instruments can be used for the aforementioned blending processes. For instance, a reaction instrument equipped with stirring wing, a single or twin screw extruder, a banbury mixer, a kneader and other kneading apparatuses such as a mixing roll are used separately or in combination. The heating and blending process is preferably achieved at the melting point temperature or higher of the polyamide resins (A) and modified polyester elastomers (B).

Modified polyester elastomers (B) of the present invention are manufactured by the graft reaction between the polyester elastomers and the modifying agents selected from unsaturated carboxylic acids and their derivatives. When the above-described reaction products are mixed with the polyamide resins (A) while heating, the afore-described carboxylic acids or their derivatives subjected to the graft reaction should be allowed to react partially with the terminal amino groups of the polyamide resins, whereby homogeneous dispersion of the polyamide resins and modified polyester elastomers in the liquid phase is accelerated by the reaction. In this manner, supplemental characteristics of elasticity and impact resistance are given to the polyamide resins while keeping their inherent excellent characteristics.

When the composition of the present invention is molded into sheets or tubes, it can be molded in various kinds of structures in accordance with the requirements of their use, comprising a mono-layer structure composed of the composition of the present invention only, the multi-layer structure comprising the polyamide layers and the layers of the modified polyester elastomer, and multi-layer structure comprising the layers of the composition of the present invention combined with the layers of the modified polyester elastomer or the polyamide layers.

BEST MODE FOR CARRYING OUT THE INVENTION

Preferred embodiments of the present invention are described hereinafter referring to the examples. The present invention is, however, never limited to the descriptions as set forth herein.

Polyamide resins used in the examples comprise nylon 6 of relative viscosity of 2.53 (as measured in 98% sulfuric acid, 1 g/100 ml, 25° C.), nylon 6,6 of relative viscosity 2.51 and poly-methaxylilene adipamide (MXD-6) with a relative viscosity of 2.10, and they were used after vacuum drying for 16 hours at 100° C.

The polyester elastomers used are as follows;

① polyether-polyester elastomer (Pelprene P150B manufactured by Toyo Boseki Kabushiki Kaisha) composed of polytetramethylene glycol and polytetramethylene terephthalate, and ② polyester type block copolymer (Pelprene S-1000 manufactured by Toyo Boseki Kabushiki Kaisha) composed of polycaprolactone and polytetramethylene terephthalate.

EXAMPLES 1–10

(A) Preparations of the modified polyester elastomers

Polyester elastomers modified with maleic anhydride as described in items ① and ② were synthesized by the following processes (denoted as ①' and ②' hereinafter);

One hundred parts by weight of ① or ②, 0.5 part by weight of maleic anhydride and 0.3 part by weight of dicumyl peroxide were blended homogeneously by using a mixer and the mixture was subjected to a twin-axial extruder of 30 mm in diameter. Modification reaction by maleic anhydride was carried out at the cylinder temperature of 200°–230° C. The reaction products were dried at 80° C. for 12 hours in a vacuum drier, thereby manufacturing modified polyester elastomers ①' and ②'.

(B) Evaluation of the polyamide resin compositions

After blending the above-described polyamide resins in a dry state with the modified polyester elastomers ①' or ②' manufactured by the process described in (A) in the ratios listed in Table 1, the mixtures were formed into pellets by using a twin-axial extruder of 30 mm in diameter. The cylinder temperature was 250° C. for nylon 6 280° C. for nylon 6,6 and 260° C. for MXD-6. The pellets formed were dried at 70° C. for 16 hours in a vacuum.

A #3 dumbbell specimen described in JIS-K6301 was prepared by using the pellets of the polyamide resin compositions manufactured by using the above-described process. Tension tests were carried out following the method described in JIS-K6301 using the test specimen. The test specimen was extended under the cross-head speed of 500 mm/min. and the load (kg) at the breaking point was measured. The value of the breaking load (kg) divided by the initial cross sectional area (cm$^2$) of the test specimen was defined as tensile strength of the material while the ratio of the initial length of the specimen to the extension of the specimen at the breaking point was defined as the tensile break elongation (%) of the material.

An oil resistance test was carried out as follows; after immersing the test specimen of the separate preparation in a JIS-#3 oil at 100° C., the specimen was subjected to the tension test, thereby investigating the changes in tensile strength and tensile break elongation.

The results of the tension tests and oil resistance tests are listed in Table 2.

COMPARATIVE EXAMPLES 1–2

Copolymers ③' subjected to modification treatment were prepared by the graft reaction as described in Examples 1–6 by using ethylene-propylene copolymer (JSREP911P manufactured by Japan Synthetic Rubber Co.). The modified copolymer ③' and polyamide resin were used in the ratio described in Table 1 and the mixture was subjected to heat-blending in the same way as in Examples 1–8 to form pellets. Test specimens were prepared from the pellets and they were subjected to several various tests. The results are listed in Table 2.

COMPARATIVE EXAMPLES 3–10

Non-modified polyester elastomers ① and ② used in Examples 1–8 were mixed with the polyamide resins in the proportions described in Table 1 and pellets were prepared by heat-blending the mixture using similar methods as described in Examples 1–8. Test specimens were prepared from the pellets and were subjected to the several tests. The results are listed in Table 2.

CFC gas resistance of the specimens obtained in Examples 7–10 was investigated as permeability of the 22-HCFC gas according to the method described below, obtaining the very excellent characteristics of 0.01 g/cm②year or less in the specimens of Examples 7 and 9, not observed at all in the specimens in Example 10, and 0.15 g/cm②year in the specimens of Example 8.

MEASURING METHOD FOR 22-HCFC GAS PERMEABILITY

Resin materials of the composition were formed into films with a thickness of 0.5 mm. The film was attached to a gas permeability measuring cell and the cell was dipped into an oil bath heated at 80° C. After the gas pressure rose to about 40 kg/cm$^2$, a manometer was connected to the cell and the amount of the permeated gas was measured after the gas permeation rate reached a constant value. The amount of the gas permeation obtained was converted into the amount per year.

compared with the corresponding values of the specimens of Comparative Examples 1-10. In the cases of the test specimens of Comparative Examples 1 and 2, tensile strengths of the specimens were so degraded that measurements were impossible. Mutual solubilities of the polyamide resins with polyolefin copolymers in Comparable Examples 1 and 2, and those with unmodified polyester elastomers in Comparable Examples 3 to 8 are supposed to be poor.

The glossy appearance of the molded samples of the resins of the examples and comparative examples were compared with each other. The molded samples in the examples displayed appreciable glossy appearances and the appearances were maintained after the samples were subjected to the oil resistance test. On the contrary, initial glossy appearances of the samples of the comparative examples were not so good and the appearances turned worse after the oil resistance tests. As is described above, it was apparent that the molded samples of the present examples were also excellent in glossy appearances.

POSSIBLE APPLICATIONS IN INDUSTRIES

The polyamide resin compositions of the present invention possess excellent characteristics in elasticity, chemical resistance, oil resistance, moldability, and mechanical characteristics such as impact resistance, tensile strength and tensile break elongation, having appreciable glossy appearances. The resins can be formed into molded products for use as engineering plastics, fibers, films and sheets etc. Various kinds of products are exemplified including extruded moldings such as tubes, hoses and belts, and injection moldings such as noise eliminating gears etc., which enables a wide range of product applications such as automobile parts, electric parts etc.

The products manufactured by using polyxylilene adipamide as a polyamide possesses excellent characteristics in CFC gas resistance and moisture permeability, thereby making the products especially useful as hoses for refrigerant.

We claim:

1. A polyamide resin composition comprising a polyamide resin (A) and a modified polyester elastomer (B)

TABLE 1

| | (part per weight) | | | Modified copolymer | | | Non-modified copolymer | |
|---|---|---|---|---|---|---|---|---|
| | Polyamide resin | | | | | | | |
| | Nylon 6 | Nylon 6,6 | MXD-6 | ①' | ②' | ③' | ① | ② |
| Example 1 | 60 | | | 40 | | | | |
| Example 2 | 60 | | | | 40 | | | |
| Example 3 | | 60 | | 40 | | | | |
| Example 4 | | 60 | | | 40 | | | |
| Example 5 | 30 | | | 70 | | | | |
| Example 6 | | 30 | | 70 | | | | |
| Example 7 | | | 60 | 40 | | | | |
| Example 8 | | | 30 | 70 | | | | |
| Example 9 | | | 45 | | 55 | | | |
| Example 10 | | | 80 | | 20 | | | |
| Comparative Example 1 | 60 | | | | | 40 | | |
| Comparative Example 2 | | 60 | | | | 40 | | |
| Comparative Example 3 | 60 | | | | | | 40 | |
| Comparative Example 4 | 60 | | | | | | | 40 |
| Comparative Example 5 | | 60 | | | | | 40 | |
| Comparative Example 6 | | 60 | | | | | | 40 |
| Comparative Example 7 | 40 | | | | | | 60 | |
| Comparative Example 8 | 40 | | | | | | | 60 |
| Comparative Example 9 | | | 60 | | | | 40 | |
| Comparative Example 10 | | | 30 | | | | 70 | |

TABLE 2

| | Tensile strength (kg/cm²) | Tensile break elongation (%) | oil resistance Tensile strength (kg/cm²) | oil resistance Tensile break elongation (%) |
|---|---|---|---|---|
| Example 1 | 520 | 200 or more | 490 | 200 or more |
| Example 2 | 470 | 200 or more | 460 | 200 or more |
| Example 3 | 540 | 200 or more | 520 | 200 or more |
| Example 4 | 510 | 200 or more | 500 | 200 or more |
| Example 5 | 400 | 200 or more | 370 | 200 or more |
| Example 6 | 410 | 200 or more | 370 | 200 or more |
| Example 7 | 590 | 200 or more | 580 | 200 or more |
| Example 8 | 430 | 200 or more | 430 | 200 or more |
| Example 9 | 470 | 200 or more | 440 | 200 or more |
| Example 10 | 760 | 120 | 770 | 100 |
| Comparative Example 1 | 330 | 200 or more | | not measurable ※ |
| Comparative Example 2 | 340 | 200 or more | | not measurable ※ |
| Comparative Example 3 | 360 | 5 | 180 | 3 |
| Comparative Example 4 | 330 | 5 | 170 | 3 |
| Comparative Example 5 | 380 | 4 | 190 | 2 |
| Comparative Example 6 | 340 | 4 | 180 | 2 |
| Comparative Example 7 | 280 | 70 | 120 | 10 |
| Comparative Example 8 | 270 | 60 | 120 | 12 |
| Comparative Example 9 | 360 | 5 | 220 | 2 |
| Comparative Example 10 | 280 | 5 | 180 | 2 |

※ Oil resistances of the samples of Comparative Examples 1 and 2 could not be measured because the original shapes of the test specimens were completely deteriorated.

As is apparent from Table 2, test specimens prepared by using the polyamide resin composition in Examples 1-8 showed larger values in tensile strength and tensile break elongation than those of Comparative Examples 1-10. In the oil-resistance test, smaller changes were observed in tensile strength and tensile break elongation after immersing the specimens prepared by using the polyamide resin composition of Examples 1-8 in oil, prepared by a free radical induced graft reaction of a polyester elastomer with about 0.01 to about 20% of a monomer selected from the group consisting of unsaturated carboxylic acids and derivatives thereof.

2. A polyamide resin composition according to claim 1, wherein the polyamide is polyxylilene adipamide.

3. A polyamide resin composition according to claim 1, wherein polyester elastomer is a polyether-polyester elastomer manufactured from polytetramethylene glycol and poly-tetramethylene terephthalate.

4. A polyamide resin composition according to claim 1, wherein polyester elastomer is a polyester type block copolymer manufactured from polycaprolactone and polytetra-methylene terephthalate.

5. A polyamide resin composition according to claim 1, wherein the unsaturated carboxylic acid is maleic anhydride.

* * * * *

UNITED STATES PATENT AND TRADEMARK OFFICE
CERTIFICATE OF CORRECTION

PATENT NO. : 5,164,445
DATED : November 17, 1992
INVENTOR(S) : Takashi NISHIDA and Shigeo KOBAYASHI It is certified that error appears in the above-identified patent and that said Letters Patent is hereby corrected as shown below:

ON THE TITLE PAGE:

[57] ABSTRACT:

Line 3, delete "(b)" and substitute therefor -- (B) --.

Column 3, line 14, delete "preferably" and substitute therefor -- preferable --;

Column 3, line 18, delete "adhesive" and substitute therefor -- adhesives --;

Column 4, line 45, delete "preferably" and substitute therefor -- preferable --;

Column 6, line 8, after "nylon 6" and before "280°C." insert -- , --;

Column 6, line 57, delete "②" and substitute therefor -- $^2$ --; and

UNITED STATES PATENT AND TRADEMARK OFFICE
CERTIFICATE OF CORRECTION

PATENT NO.  : 5,164,445
DATED       : November 17, 1992
INVENTOR(S) : Takashi NISHIDA and Shigeo KOBAYASHI It is certified that error appears in the above-identified patent and that said Letters Patent is hereby corrected as shown below:

Column 6, line 59, delete "②" and substitute therefor -- 2 --.

Signed and Sealed this

Twelfth Day of October, 1993

Attest:

BRUCE LEHMAN

Attesting Officer          Commissioner of Patents and Trademarks